United States Patent Office 3,422,080
Patented Jan. 14, 1969

3,422,080
ALFIN CATALYST COPOLYMERIZATION OF BUTENE-2 WITH BUTADIENE AND ISOPRENE
Edward A. Hedman, Harrison, N.Y., and Bruce W. Hubbard, Jr., Oak Park, Ill., assignors to The Richardson Company, Melrose Park, Ill., a corporation of Ohio
No Drawing. Continuation of application Ser. No. 796,771, Mar. 3, 1959. This application Apr. 8, 1966, Ser. No. 539,851
U.S. Cl. 260—85.3                   20 Claims
Int. Cl. C08d 1/14; C08d 3/06; C08d 3/10

This invention is concerned with reactions involving the use of the "Alfin" catalyst and, more particularly, relates to the copolymerization of a conjugated, unsaturated polyolefin with butene-2. The present application is a continuation of copending application Ser. No. 796,771, filed Mar. 3, 1959, now abandoned which is a continuation-in-part of application Ser. No. 727,057, filed Apr. 8, 1958, now abandoned.

Alkali metal-catalyzed polymerization of conjugated, unsaturated diolefins, such as isoprene, butadiene-1,3 and similar compounds, has been known for some time and has become a generally accepted method of producing synthetic rubbers. Perhaps the most common alkali metal catalyst is sodium. Production of synthetic rubber using a sodium catalyst, while giving satisfactory yields, normally involves a matter of time, such as a day or longer, to achieve the results desired and, hence, for this reason has some disadvantage.

A new type of catalyst, developed by Avery A. Morton, has shown superior ability to catalyze certain polymerization reactions and especially the polymerization of butadiene. This new catalyst, identified as the "Alfin" catalyst, has effectively polymerized butadiene in a matter of minutes, producing polymers which have considerably higher molecular weights than have hereto been attained using the commonly accepted sodium or other alkali metal catalyst. This new catalyst has been described in a number of publications, including Morton et al., J. Amer. Chem. Soc., 69,950 (1947), and Morton, The Alfin Reagent, Advances in Catalysis, volume IX, (1957).

It is believed that the unique polymerization induced by the Alfin catalyst is a result of a specific adsorption on the surface of the catalyst, whereby the molecules are both concentrated and oriented. Somewhat similar results have been attained by the use of very high pressures which, in effect, serve to concentrate the molecules for polymerization.

The Alfin catalyst is a complex mixture of organo-alkali metal compounds, particularly alkenyls and alkoxides, with an alkali metal halide. Generally, the catalyst comprises sodium derivatives of a secondary alcohol and an aliphatic olefin. A particular catalyst found to be highly effective in polymerizing butadiene comprises a mixture of allyl sodium, sodium isopropoxide and NaCl. Such a catalyst may be formed by first adding amyl chloride to sodium, followed by adding isopropyl alcohol, in small amounts, until a predetermined portion of the amyl sodium is converted to sodium isopropoxide. Propylene gas is then passed into the mixture, reacting with the remainder of the amyl sodium to give allyl sodium. The sodium chloride formed during the reaction is bound up in the resulting insoluble aggregate catalyst.

Other Alfin catalysts have also been developed which may be considered as variations of the foregoing. Thus, benzyl sodium may be used in place of allyl sodium, the final complex being formed by introducing toluene rather than propylene into the intermediate sodium amyl isopropoxide mixture. As an alternate, the intermediate mixture may be first treated with propylene and then with toluene. Further, in addition to isopropyl alcohol, other secondary alcohols, having a methyl group joined to the carbon atom containing the hydroxyl group, may, likewise, be used to initially react with the sodium amyl to produce a sodium alkoxide in the intermediate mixture, for example, methyl ethyl carbinol.

The secondary alcohol primarily should be one having the following general formula:

$$CH_3-CH-R$$
$$\phantom{CH_3-CH-}OH$$

wherein R may be a saturated alkyl group, such as a methyl, ethyl or propyl group. Cyclohexanol, a secondary alcohol, may also be used.

Butadiene polymerization using an Alfin catalyst results in the formation of a predominantly linear chain with no appreciable side chains and a high molecular weight polymer having considerable tensile strength. Approximately seventy-five percent of the butadiene, polymerized with an Alfin catalyst, has been determined to be of the trans 1,4 isomer variety as distinguished from the normal sodium catalyst type reaction which results, primarily, in a 1,2 isomer polymerization product.

While certain conjugated unsaturated monomers, such as isoprene and butadiene-1,3, have been homopolymerized or copolymerized using well-known catalysts and, also, the Alfin catalyst, butene-2 has not, as far as is known, been successfully homopolymerized or copolymerized in a manner which has permitted its extensive commercial use. In some instances, the prior art has indicated that butene-2 has been copolymerized with an unsaturated olefin, such as butadiene. However, in such instances, it has also been indicated that the copolymers are liquid and have a relatively low molecular weight, generally of the order of 50,000 or less. Heretofore, butene-2 has been used, primarily, as a fuel or as a source of butadiene upon further cracking. Butene-2 is a by-product of the oil-cracking industry and, accordingly, is readily available and is also, at the present time, relatively inexpensive. Hence, this compound offers excellent possibilities as a raw material, providing it can be converted to a useful product.

Accordingly, one of the objects of the present invention is the provision of a method for converting butene-2 into a new and useful product.

Another object of the invention is the production of a new high molecular weight copolymer from a conjugated, unsaturated olefin and butene-2.

A further object is to provide a new elastomeric composition having unusual properties of toughness and tensile strength.

These and other objects will become more apparent from the disclosure of the invention in further detail hereinafter.

It is well-known that butadiene (butadiene-1,3) and its homologues can be polymerized to produce synthetic rubber. Likewise, substituted halogen derivatives of butadiene have also been polymerized and butadiene has been copolymerized with other compounds containing a vinyl group, in particular, styrene and vinyl chloride.

It has now been discovered that certain new high molecular weight elastomers can be formed by copolymerizing butadiene-1,3 or isoprene with butene-2 in the presence of an Alfin catalyst. The elastomers resulting from such reactions also have unusually high tensile strength and toughness as compared to many commercially available elastomers.

In further disclosing the basic principles of the invention and, particularly the examples, reference will frequently be made to the presently preferred Alfin catalyst, namely a complex mixture of sodium isopropoxide, sodium allyl and sodium chloride. However, it is not intended that the invention is thereby limited to this specific catalyst in view of the fact that the Alfin catalyst may be varied, as indicated hereinabove, to achieve similar results.

As previously indicated, butadiene has been homopolymerized using an Alfin catalyst to produce relatively high molecular weight elastomers. At present, butene-2 has not been successfully homopolymerized with an Alfin catalyst. When isoprene or butadiene and butene-2 monomers are mixed in the presence of an Alfin catalyst, copolymerization rapidly occurs, usually in a matter of minutes, yielding a rubbery of elastomeric mass greater than would result from the homopolymerization of isoprene or butadiene alone. It is believed that the copolymerization is due in part to the selective adsorption of the isoprene or butadiene and butene-2 monomers of the mixture by the catalyst surface.

Various ratios of butene-2 monomer to isoprene or butadiene monomer may be mixed together for purposes of copolymerization, with yields of elastomer increasing with increase of butene-2 monomer, up to a ratio of about one to one. When the amount of butene-2 monomer to butadiene monomer, for example, in the reaction mixture is above a ratio of about one to one, the total yield of elastomeric copolymer tends to decrease and free butene-2 will be found in the reaction mass. This characteristic is believed due, primarily, to the fact that substantially all polymerization reactions were limited to a maximum time of one hour, whereupon the reaction conditions were stopped. A time limit of one hour was selected principally because of the fact that the major part of the reaction for most mixtures of monomers was completed, for all practical purposes, in considerably less time, usually a matter of minutes. The presence of large amounts of butene-2 tends to decrease the rate of reaction. Thus, while the major part of the reaction may be, and normally is, completed within an hour, additional yields may be obtained by permitting the reaction to continue considerably beyond the arbitrary one hour time limit. However, percentagewise, the additional yield would be relatively small.

Both the cis and trans isomers of butene-2 were readily copolymerized with isoprene and butadiene-1,3. Experimental activities conducted thus far indicate that copolymers may be formed containing up to about fifty percent butene-2.

The presently preferred Alfin catalyst is formed by first reacting three moles of sodium with one and one-half moles of amyl chloride. Isopropanol, in predetermined mole quantities, is then reacted with the sodium amyl, exemplary isopropanol quantities being 0.75, 0.83 and 1.00 mole. Propylene gas, in excess, is then reacted with the remaining unreacted sodium amyl. The ratio of sodium alkoxide to sodium allyl in the presently preferred Alfin catalyst complex used for copolymerization can be varied over a relatively wide range; however, yields and molecular weights will vary, with corresponding variance in properties of the elastomer. In general, an Alfin catalyst derived from an intermediate formed by using lower mole quantities of isopropanol, such as 0.75 mole, will give higher yields of copolymer from the initial monomers as compared to a catalyst derived from an intermediate formed by using one mole of isopropanol, although the elastomer resulting from the first type of catalyst will have lower molecular weights.

The butadiene-1,3-butene-2 copolymers made, using an Alfin catalyst derived from an intermediate prepared by using 0.75 to 1.00 mole of isopropanol, have been found to have molecular weights, based on viscosity determinations, from a minimum of about five million up to the vicinity of about seventeen million. Molecular weights of this order can be contrasted with a molecular weight of about 270,000 for the usual GR–S rubber and approximately three million for natural rubber. Correspondingly, the isoprene-butene-2 copolymers have been found to have an average viscosity molecular weight of about 750,000.

In making elastomeric copolymers, the butadiene and butene-2 monomers, for example, in a gaseous state, are passed preferably through purifying agents to remove water, inhibitors and other impurities which would affect the reaction or the catalyst. The monomers are then usually liquified and simultaneously introduced into an inert hydrocarbon solvent, such as pentane, hexane or heptane. In particular, the solvent should be one which does not affect the activity of the catalyst. After forming a solution of the monomers, the Alfin catalyst, in a compatible, inert hydrocarbon suspension, is added in desired quantities and the reaction begins immediately, with a rise in temperature to a level of about 55° C. or slightly above from the presently preferred minimum starting temperature of about 25° C. As the reaction is customarily conducted in a confined atmosphere, pressures within the reaction vessel will normally rise to about seventy pounds per square inch maximum. The reaction is completed within a relatively short period, normally less than an hour and usually in about ten minutes, resulting in a swollen, rubbery gel having the solvent entrapped. An alternate and sometimes preferred process comprises adding a solution of the monomers dissolved in an inert hydrocarbon solvent or a mixture of liquid monomers to a suspension of the catalyst in the solvent as a vehicle. This alternate process frequently results in a more homogeneous product and higher yields.

As indicated, the reaction is preferably initiated at about 25° C. If temperatures below this level are used, the reaction rate declines and the quantity of catalyst necessary to achieve the desired copolymerization increases.

Large quantities of inert hydrocarbon solvent are preferably used to assist in dissipating the heat resulting from the reaction and to moderate the reaction. Thus, in a typical example, 25 grams of butene-2 and 50 grams of butadiene will be added to approximately 450 ml. of purified pentane to form a starting solution.

The solvent contained in the swollen elastomer can be readily removed by subjecting the mass to warm air, leaving a tough, white-appearing rubber. If the elastomer is to be compounded with the usual additives employed with natural or other synthetic rubbers, it may be desirable to first mix the swollen mass containing the solvent with one of the standard rubber processing oils and subsequently remove the solvent. Typical processing oils are Sundex 53 sold by the Sun Oil Company and Indonex 632½ sold by Standard Oil of Indiana. Actually the copolymers will process exceedingly well without using the customary processing oils, an obvious advantage over many commercially available elastomers. The elastomer, admixed with or without a processing oil, may be compounded with fillers, accelerators, sulfur and other common rubber additives and worked on a regular rubber mill. The resulting compounded product may then be cured, as by a molding operation, to produce shaped articles having enhanced properties such as tensile strength and impact resistance, not heretofore obtainable with currently available elastomers. Further, the copolymer has been found to require less sulfur to cure a desired vulcanized condition and, also, has greater oxidation stability.

In the examples given below, molecular weights will be compared in terms of Dilute Solution Viscosity, abbreviated DSV, a practice which enables better conception of the relatively large molecular weights which are involved in polymeric compositions such as are generally contemplated by the present invention. The DSV of a particular composition is determined by the following formula:

$$DSV = \frac{2.303 \log \frac{t}{t_0}}{\text{grams elastomer/100cc. of solution}}$$

wherein $t$ is the flow time of the elastomer in a selected solvent using an Ostwald viscosimeter and $t_0$ is the flow time of the solvent.

In determining DSV of the present copolymer compositions, samples of the Alfin catalyzed polymer are suspended in 100 ml. of benzene to produce a saturated solution having a concentration of about 0.1–0.2 percent, which is filtered prior to viscosity measurement. Concentrations of the rubber in the solvent are determined by evaporating aliquot portions of the solution. A DSV determination is normally not considered entirely appropriate as an accurate measurement of molecular weight but, rather, serves primarily as only a rough indication of molecular weight. If a more exact measurement of molecular weight is desired, it should be determined by other means.

Copolymers of butadiene and butene-2 may be made having a DSV of between about 6–20, although the present predominating DSV range has been found to be between 8–15. For purposes of comparison, a commercially available GR–S, with an average molecular weight of about 270,000, has a DSV of approximately 2.0, while natural rubber, having an average molecular weight of about three million, has a DSV of between 5–7.

Example I

Four hundred and fifty ml. of purified pentane, 51 grams of butadiene and 25 grams of butene-2 were placed in a dry, nitrogen flushed twenty-eight ounce container. The container was capped and placed in a thermostated water bath until the contents had reached 25° C. Twenty-five ml. of Alfin catalyst (derived from 0.03 gram atoms of sodium) in pentane suspension, were drawn into a hypodermic syringe and injected into the container. The container was shaken by hand for one minute while the blue-green suspension rapidly gelled, the container becoming warm to the touch. A second mass was, likewise, formed and the products from the two reactions were mixed, giving a total of 110 grams, representing a yield of 109%. The DSV of each product was 14.

Example II

Using the procedure employed in Example I, 25 ml. of Alfin catalyst was added to a solution of 53 grams of butadiene and 25 grams of butene-2 in 450 ml. of pre-purified heptane. Upon removal of the solvent, 65 grams of elastomer were obtained having a DSV of 12. This represented a yield of 123%, based on the homopolymerization of butadiene.

Example III

To a solution of 49 grams of butadiene and 50 grams of butene-2 in 450 ml. of pre-purified heptane was added 25 ml. of Alfin catalyst as in Example I. The resultant solvent-free elastomer weighed 57 grams and had a DSV of 12. Based on the weight of butadiene homopolymerization, this represented a yield of 116%.

Example IV

A reaction similar to that of Example III was carried out with a solution containing 100 grams of butene-2 in place of the 50 grams used. The reaction resulted in the formation of 57 grams of elastomer with a DSV of 11. The yield, based on the butadiene homopolymerization, was 116%.

In each of the foregoing examples, the catalyst was formed using 0.83 mole of isopropanol.

The following table illustrates the effect of varying the mole quantities of isopropanol used in preparing the Alfin catalyst complex and, also, for comparison, includes corresponding results obtained by homopolymerization of butadiene.

| Catalyst* | Butadiene, grams | Butene-2, grams | Elastomer, grams | Yield, percent | DSV |
|---|---|---|---|---|---|
| 1.00 | 50 | 0 | 36 | 72 | 13 |
| 1.00 | 50 | 25 | 55 | 110 | 10 |
| 0.83 | 50 | 0 | 45 | 90 | 15 |
| 0.83 | 50 | 25 | 62 | 124 | 12 |
| 0.75 | 50 | 0 | 50 | 100 | 13 |
| 0.75 | 50 | 25 | 66 | 132 | 8 |

*Moles of isopropanol added during preparation of the Alfin catalyst from three gram-atoms of sodium.

Butadiene-butene-2 copolymers, as contemplated herein, were subjected to infra-red spectroscopic analysis. Measurements were made in a Perkin-Elmer Model 21 recording spectrophotometer, wherein the sample was retained in a 1-mm. salt block cell. The absorption at wave lengths of 10.34 and 10.98 microns were compared. Using the standard Beers' Law to analyze the data, ratios of the number of trans double bonds to vinyl double bonds indicated by infra-red absorbencies at the 10.34 wavelength and the 10.98 wave length, respectively, were found to generally be between 1.5 to 3.5. This ratio range may be compared to the ratio range of 2–4 for homopolymerized butadiene. The average ratio for the copolymer was found to be about 2.2; whereas the average ratio for the butadiene homopolymer was found to be about 2.6.

The following table discloses examples of the copolymerization of isoprene with butene-2.

| Isoprene, grams | Butene-2, grams | Elastomer, grams | Yield, percent | DSV | M.W./$10^6$ |
|---|---|---|---|---|---|
| 63 | 0 | 45 | 71.4 | 6.01 | 1.4 |
| 63 | 25 | 50 | 79.4 | 5.00 | 1.0 |
| 63 | 25 | 55 | 87.3 | 4.60 | 0.9 |

All of the above examples were run using a 0.83 Alfin catalyst. The highest yield, when isoprene was homopolymerized, was 71.4%; whereas when butene-2 was copolymerized with isoprene, the yields were all above 71.4%. As previously indicated, the average molecular weight of the copolymers of isoprene with butene-2 was found to be approximately 750,000. The isoprene-butene-2 copolymer DSV range was determined to be between about 3–6.

The copolymer of isoprene and butene is made using a process substantially the same as that described for butadiene and butene-2.

Of interest are the improved milling properties of butadiene-butene-2 copolymer, particularly as compared to a butadiene homopolymer made using an Alfin catalyst. The homopolymer, in the absence of a solvent, does not band or sheet when subjected to the action of a regular rubber mill, but rather, the mill tends to crumble or disintegrate the homopolymer. However, the copolymer is readily capable of undergoing the usual rubber milling operations and can be banded or sheeted on such a mill.

Processing and compounding of the new elastomeric copolymers forms the subject matter of copending application Ser. No. 53,423 filed Sept. 1, 1960, now abandoned. Accordingly, no attempt will be made to develop such subject matter herein. However, for purposes of further illustrating the properties obtainable with the copolymers, limited comparison will be made with the homopolymer in connection with the use of the two polymeric materials in general molding compositions. In this respect, two moldable compositions were prepared containing about sixty-five percent coal dust as a filler, together with other customary rubber additives, such as sulfur, lime, amines and magnesium oxide. One composition contained approximately ten percent of the butadiene homopolymer as the binder and the other contained the same amount of butadiene-butene-2 copolymer as the binder. The following table represents the test results obtained on test slabs molded from the two compositions.

| Binder | DSV | Impact in lbs. | Tensile, p.s.i. | Elongation |
|---|---|---|---|---|
| Homopolymer | 12.5 | 9.8 | 1,850 | 6.5 |
| Copolymer | 12.5 | 14.5 | 1,600 | 8.9 |

As indicated from the above data, the copolymer offers definite improvements over the homopolymer with respect to properties obtainable for products formed from copolymer compositions.

Having described certain exemplary embodiments of the invention, the same is intended to be limited only by the scope of the following claims.

What is claimed is:

1. A relatively high molecular weight elastomer consisting essentially of the copolymerization product of butene-2 with a conjugated unsaturated diolefin selected from the class consisting of butadiene-1,3 and isoprene having a minimum dilute solution viscosity of between about 3–6 wherein said copolymerization product is formed by reaction of said diolefin and said butene-2 in the presence of an Alfin catalyst selected from the class consisting of: (1) a mixture of an alkali metal alkenyl, alkoxide and halide, and (2) a mixture of an alkali metal benzyl, alkoxide and halide and wherein said butene-2 comprises a maximum of about fifty percent by weight of said copolymerization product.

2. A copolymer of butadiene-1,3 and butene-2 as described in claim 1 having a dilute solution viscosity of between 6–20.

3. A copolymer of butadiene-1,3 and butene-2 as described in claim 1 having a dilute solution viscosity of between 6–20 and characterized by a ratio of trans olefinic unsaturation to vinyl unsaturation of between about 1.5 to 3.5 as evidenced by infra-red absorption at the 10.34 micron wave length versus the 10.98 micron wave length.

4. A copolymer as described in claim 3 wherein said ratio is about 2.2.

5. A copolymer of butadiene-1,3 and butene-2 as described in claim 1 having a dilute solution viscosity of between about 8–15 and characterized by a ratio of trans olefinic unsaturation to vinyl unsaturation of between about 1.5 to 3.5 as evidenced by infra-red absorption at the 10.34 micron wave length versus the 10.98 micron wave length.

6. A copolymer as described in claim 5 wherein said ratio is about 2.2.

7. A copolymer of butadiene-1,3 and butene-2 as described in claim 1 having a viscosity molecular weight of at least five million.

8. A copolymer of isoprene and butene-2 as described in claim 1 having a dilute solution viscosity of between about 3–6.

9. A copolymer as described in claim 8 having an average viscosity molecular weight of approximately 750,000.

10. The method of making a high molecular weight copolymer which consists essentially of reacting butene-2 with a conjugated, unsaturated diolefin selected from the class consisting of butadiene-1,3 and isoprene in the presence of an Alfin catalyst selected from the class consisting of: (1) a mixture of an alkali metal alkenyl, alkoxide and halide, and (2) a mixture of an alkali metal benzyl, alkoxide and halide.

11. The method of making a high molecular weight copolymer as described in claim 10 which consists essentially of reacting butene-2 with a conjugated, unsaturated diolefin selected from the class consisting of butadiene-1,3 and isoprene in the presence of a catalyst consisting of a mixture of sodium chloride, sodium alkenyl derived from an aliphatic olefin and sodium alkoxide derived from a methyl alkyl carbinol.

12. The method of making a high molecular weight copolymer as described in claim 10 which consists essentially of reacting butadiene-1,3 with butene-2 in the presence of a catalyst complex consisting of sodium chloride, sodium allyl and the sodium derivative of a secondary alcohol having the generic formula:

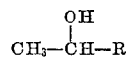

wherein R is a member of the class consisting of a methyl, ethyl or propyl group.

13. The method of making a high molecular weight copolymer as described in claim 10 which consists essentially of forming a solution of butadiene-1,3 and butene-2 in an inert hydrocarbon solvent, and introducing into said solution a catalyst complex consisting of sodium isopropoxide, sodium allyl and sodium chloride.

14. The method of claim 13 wherein the reaction is initiated at a minimum temperature of about 25° C.

15. The method of claim 14 wherein the normally gaseous monomers are liquified prior to introducing them into the hydrocarbon solvent.

16. The method of making a high molecular weight copolymer as described in claim 10 which consists essentially of reacting butadiene-1,3 with butene-2 in the presence of a catalyst complex consisting of sodium isopropoxide, sodium allyl and sodium chloride.

17. The method as described in claim 16 wherein the catalyst is prepared by initially reacting about three moles of sodium with approximately one and one-half moles of amyl chloride, followed by reacting between about 0.75 to 1.00 mole of isopropanol with the resulting sodium amyl and finally reacting excess propylene gas with the remaining sodium amyl.

18. The method of making a high molecular weight copolymer which consists essentially of introducing a mixture of butadiene-1,3 and butene-2 monomers in a solution of an inert hydrocarbon solvent into an inert hydrocarbon suspension of a catalyst complex consisting of sodium isopropoxide, sodium allyl and sodium chloride.

19. The method of claim 18 wherein the reaction is initiated at a minimum temperature of about 25° C.

20. The method of making a high molecular weight copolymer as described in claim 10 which consists essentially of reacting butene-2 with a conjugated, unsaturated diolefin selected from the class consisting of butadiene-1,3 and isoprene in the presence of a catalyst comprising benzyl sodium, sodium isopropoxide and sodium chloride.

References Cited

UNITED STATES PATENTS 3,135,725   6/1964   Carlson et al. _____ 260—94.3

FOREIGN PATENTS 543,292   6/1956   Belgium.
520,873   1/1956   Canada.

OTHER REFERENCES

Rokityanskii, I. V., Polymerization of Mixtures of 1,3-Butadiene With 2-Butane and With Pentane by Sodium, Nat. Petroleum News, vol. 37, pp. R133–R136, Feb. 7, 1945.

D'Ianni et al., Butadiene Polymers and Polyisoprene Prepared by Alfin and Emulsion Processes, Ind. and Eng. Chem., vol. 42, No. 1, January 1950, pp. 95–102.

Morton, A. A., The Alfin Reagent, Advances in Catalysis, vol. 9, 1957, pp. 743–753 relied on.

JOSEPH L. SCHOFER, Primary Examiner.

W. F. HAMROCK, Assistant Examiner.

U.S. Cl. X.R.

260—94.2